(12) United States Patent
Jung et al.

(10) Patent No.: US 10,211,997 B2
(45) Date of Patent: Feb. 19, 2019

(54) METHOD AND APPARATUS FOR PLAYING BACK SCENE USING UPNP

(75) Inventors: Dong-Shin Jung, Suwon-si (KR); Joo-Yeol Lee, Seoul (KR); Se-Hee Han, Seoul (KR); Je-Young Maeng, Suwon-si (KR); Fei Fei Feng, Suwon-si (KR); Russell Berkoff, San Jose, CA (US)

(73) Assignee: Samsung Electronics Co., Ltd (KR)

( * ) Notice: Subject to any disclaimer, the term of this patent is extended or adjusted under 35 U.S.C. 154(b) by 1222 days.

(21) Appl. No.: 12/541,524

(22) Filed: Aug. 14, 2009

(65) Prior Publication Data

US 2010/0067872 A1    Mar. 18, 2010

(30) Foreign Application Priority Data

Aug. 14, 2008 (KR) .................. 10-2008-0080191
Oct. 10, 2008 (KR) .................. 10-2008-0099755
Aug. 6, 2009 (KR) .................. 10-2009-0072364

(51) Int. Cl.
*H04L 29/06* (2006.01)
*H04L 12/28* (2006.01)

(52) U.S. Cl.
CPC .......... *H04L 12/2805* (2013.01); *H04L 69/18* (2013.01); *H04L 69/24* (2013.01); *H04L 65/1093* (2013.01); *H04L 65/4084* (2013.01)

(58) Field of Classification Search
CPC .......... H04N 21/4325; H04N 21/4825; H04N 21/8456; H04L 12/2805; H04L 69/18; H04L 69/24
USPC ............................ 725/76; 709/203, 230–237
See application file for complete search history.

(56) References Cited

U.S. PATENT DOCUMENTS

| 6,370,316 B1 | 4/2002 | Yamada et al. |
| 7,873,059 B2 | 1/2011 | Morita et al. |
| 8,209,260 B2 | 6/2012 | Kim et al. |
| 2002/0013943 A1* | 1/2002 | Haberman et al. ............ 725/39 |

(Continued)

FOREIGN PATENT DOCUMENTS

| CN | 1115949 | 1/1996 |
| CN | 101001354 | 7/2007 |

(Continued)

OTHER PUBLICATIONS

Japanese Office Action dated Oct. 21, 2014 issued in counterpart application No. 2013-253205.

(Continued)

*Primary Examiner* — Kunal Langhnoja
(74) *Attorney, Agent, or Firm* — The Farrell Law Firm, P.C.

(57) ABSTRACT

A method and apparatus for playing back a scene using Universal Plug and Play (UPnP). A control point sends a request for a scene to be played back to a media server that stores Audio/Video (AV) content and receives the scene to be played back from the media server in response to the request. The control point receives information about supportable protocol and file format from a media renderer that will play back content, and determines a content resource, a protocol and a file format to be used for playback based on the information. The control point composes a scene to be played back based on the received scenes. The media renderer plays back the composed scene.

17 Claims, 12 Drawing Sheets

(56) References Cited

U.S. PATENT DOCUMENTS

| | | | |
|---|---|---|---|
| 2005/0108766 A1* | 5/2005 | Hlasny et al. | 725/100 |
| 2005/0138137 A1* | 6/2005 | Encarnacion et al. | 709/217 |
| 2008/0050096 A1* | 2/2008 | Ryu | 386/99 |
| 2010/0115062 A1 | 5/2010 | Yoshida et al. | |

FOREIGN PATENT DOCUMENTS

| | | |
|---|---|---|
| EP | 1 531 583 | 5/2005 |
| JP | 2001-028722 | 1/2001 |
| JP | 2004-362099 | 12/2004 |
| JP | 2007-183944 | 7/2007 |
| JP | 2007-235584 | 9/2007 |
| JP | 2008-041120 | 2/2008 |
| JP | 2008-146333 | 6/2008 |
| KR | 100582549 | 5/2006 |
| KR | 100645171 | 11/2006 |
| KR | 100690125 | 2/2007 |
| KR | 100694157 | 3/2007 |

OTHER PUBLICATIONS

Chinese Office Action dated Apr. 12, 2017 issued in counterpart application No. 201510051338.4, 19 pages.

\* cited by examiner

```
<DIDL-Lite
 xmlns:dc="http://purl.org/dc/elements/1.1/"
 xmlns="urn:schemas-upnp-org:metadata-1-0/DIDL-Lite/"
 xmlns:upnp="urn:schemas-upnp-org:metadata-1-0/upnp/"
 xmlns:xsi="http://www.w3.org/2001/XMLSchema-instance"
 xsi:schemaLocation="
    urn:schemas-upnp-org:metadata-1-0/DIDL-Lite/
    http://www.upnp.org/schemas/av/didl-lite.xsd
    urn:schemas-upnp-org:metadata-1-0/upnp/
    http://www.upnp.org/schemas/av/upnp.xsd">
    <item id="Segment_01" parentID="SegmentContainer_01" restricted="0">
        <dc:title>Segment1</dc:title>
        <upnp:class>object.item.videoItem</upnp:class>
        <res id="segment-res" protocolInfo="http-get:*:video/mpeg: *">
            http:// 192.168.0.1/video/my_movie.mpeg?start=00:05:00;end=00:08:00
        </res>
        <upnp:resExt id="segment-res">
            <upnp:segmentInfo baseContentId="base-content" baseResID="base-res">
                <upnp:timeRange start="00:05:00" end="00:08:00"/>
            </upnp:segmentInfo>
        </upnp:resExt>
    </item>
</DIDL-Lite>
```

FIG.9

AVT::SetScenes ()

| Argument | Direction | relatedStateVariable | Discription |
|---|---|---|---|
| InstanceID | IN | A_ARG_TYPE_InstanceID | Virtual instance of the AVT service |
| ScenesToBePlayed | IN | A_ARG_TYPE_PlaySceneList | List of scenes to be played |
| ScenesToBeSkipped | IN | A_ARG_TYPE_SkipSceneList | List of scenes to be skipped |

FIG.11

AVT::SetScenes ()

| Argument | Direction | relatedStateVariable | Discription |
|---|---|---|---|
| InstanceID | IN | A_ARG_TYPE_InstanceID | Virtual instance of the AVT service |
| SceneGroup | IN | A_ARG_TYPE_SceneGroup | Combination of scenes (Scene Group) |

FIG.12

METHOD AND APPARATUS FOR PLAYING BACK SCENE USING UPNP

PRIORITY

This application claims priority under 35 U.S.C. § 119(a) to a Korean Patent Applications filed in the Korean Intellectual Property Office on Aug. 14, 2008 and assigned Serial No. 10-2008-0080191, on Oct. 10, 2008 and assigned Serial No. 10-2008-0099755, and on Aug. 6, 2009 and assigned Serial No. 10-2009-0072364, the contents of both of which are incorporated herein by reference.

BACKGROUND OF THE INVENTION

1. Field of the Invention

The present invention relates generally to a home network using Universal Plug and Play (UPnP), and more particularly, to a method and apparatus for enabling playback of scenes or scene groups at a renderer in playing back Audio/Video (AV) content using UPnP.

2. Description of the Related Art

In general, a home network including Internet Protocol (IP)-based private networks connects various types of home devices, such as Personal Computers (PCs), intelligent products and wireless devices, to one network through a common virtual computing environment called "middleware", and controls the devices.

The term middleware refers to software for connecting various digital devices on a peer-to-peer basis and enabling communication between the devices. Various technologies, such as Home AV Interoperability (HAVI), UPnP, Java Intelligent Network Infra-structure (JINI), and Home Wide Web (HWW), are types of middleware software that have been proposed up to now.

Since a Plug and Play (PnP) function, has been added to the operating system, it has been very easy to install and set peripheral devices of PCs. UPnP, which has evolved from PnP, is a technology for enabling various home appliances and network devices such as network printers and Internet gates to perform networking, particularly home networking, by extending such convenient functions up to the entire network based on the Internet standard technologies such as Transmission Control Protocol/Internet Protocol (TCP/IP), Hyper Text Transfer Protocol (HTTP), and eXtensible Markup Language (XML).

A UPnP network consists of Controlled Devices (CD), which are connected to and controlled by an IP-based home network, and Control Points (CP) for controlling the controlled devices. The UPnP network performs communication between the control point and the controlled devices through the following steps using a UPnP protocol stack structure that includes Internet protocols such as TCP/IP and HTTP, and technologies such as XML and Simple Object Access Protocol (SOAP).

In a first (or addressing step), a control point and a controlled device have their own individual IP addresses. Upon joining the network, the controlled device fetches its IP address using a Dynamic Host Configuration Protocol (DHCP), or is assigned an IP address using automatic IP addressing if there is no DHCP server in the network.

In a second (or discovery step), the control point searches for the controlled device, or the controlled device advertises its location. The discovery step is performed using a Simple Service Discovery Protocol (SSDP). If a controlled device is added to the network, the controlled device delivers an alive message of SSDP to the network by IP multicasting, and then the control point may determine presence/absence of the controlled device by receiving the alive message. When a control point newly joins the network, the control point multicasts a Multicast-search (M-search) message of SSDP to the network, and then all of the controlled devices, which checked the M-search message, send M-search response messages containing their own information to the control point.

In a third (or description step), the control point checks description contents of the controlled device. When the control point desires the controlled device after checking the response message, the control point may send to the controlled device a request for detailed information related to the controlled device. Upon receipt of the request, the controlled device sends its information in an XML document.

In a fourth (or control step), the control point operates the controlled device by controlling a function of the controlled device. When the control point intends to control an arbitrary controlled device, the control point sends a desired service to the controlled device using SOAP, based on the detailed information related to the controlled device. SOAP is a protocol that is written on HTTP by XML for the purpose of invoking (calling) a remote function.

In a fifth (or eventing step), the control point receives a change in event of the controlled device. The control point sends a subscribe request for a relevant event to the controlled device when it desires to receive an event message from the controlled device. If the subscription is made successful, the controlled device sends an event message to the control point using General Event Notification Architecture (GENA).

In a sixth (or presentation step), the control point presents a state of the controlled device using a Hyper Text Markup Language (HTML) of the controlled device.

FIG. 1 illustrates device discovery and action execution in a conventional UPnP network system. Referring to FIG. 1, in step 110, a control point 101 discovers or searches for a controlled device 102, or the controlled device 102 advertises its location, thereby performing the discovery step. In step 120, the control point 101 sends an action request to the controlled device 102. In step 130, the controlled device 102 performs an action corresponding to the received action request. In step 140, the controlled device 102 responds the control point 101 with the action execution result. To be specific, the controlled device 102 performs the requested action, and transmits the normal execution result for the action or an error message to the control point 101.

Based on the basic UPnP control method, a UPnP controlled device can provide various services or functions to the control point, such as controlling a UPnP controlled device such that AV contents stored in the UPnP controlled device can be played back in other UPnP controlled devices supporting a rendering service. When the UPnP controlled device is a gateway, the UPnP control point can change and set an IP address band and addresses of a subnet and a gateway, which are to be assigned to the devices in the home, by controlling the UPnP gateway or the controlled device.

The UPnP control point requests a control action upon receiving an input from a user through a user interface, displays execution results on the requested action for the user, and presents an event notification from the controlled device. An input method offered by the UPnP control point is limited by types, hardware characteristics and performances of peripheral devices that are physically connected to the UPnP control point.

FIG. 2 illustrates a conventional system that plays back AV content using a UPnP protocol. The AV content playback system using UPnP includes a media server 220 in which AV contents are stored, a media renderer 230 for playing back the AV contents, and an AV control point 210 for controlling the media server 220 and the media renderer 230 according to a command from a user.

The media server 220 stores a variety of image, audio, video and content files, and may be realized with such devices as PCs, set-top boxes, Digital Video Disc (DVD) players, Motion Pictures Experts Group (MPEG) Layer Audio 3 (MP3) Players (MP3P), Digital Still Cameras (DSC5), all of which have storage means such as Hard Disk Drivers (HDDs), flash memories and DVD/CD. The media service 220 delivers the stored contents to the media renderer 230 for content playback under the control of the AV control point 210.

The user can enjoy the AV contents with the media renderer 230, which may be realized with a device equipped with a display and/or a speaker, such as portable terminals, Digital TVs (DTV), HiFi Audio sets and monitors.

The AV control point 210 sends invocations for various UPnP actions necessary for content playback to the media server 220 and the media renderer 230 to execute the user's commands. The AV control point 210 may be realized in a user input device such as a remote controller, as well as in the media server 220 or the media renderer 230.

FIG. 3 illustrates a conventional operation of playing back specific content using UPnP. In FIG. 3, a user appreciates AV content using a UPnP control point 302, a media server 301 and a media renderer 303. In step 310, the control point 302 fetches a metadata list for AV contents existing in the media server 301 by invoking a Browse/Search( ) action and then displays the metadata list on its screen in order to check a list of the AV contents in the media server 301. If the user selects specific content and makes a command to play back the content at a specific media renderer 303, the control point 302 receives a list of protocols and formats that can be played back in the media renderer 303, by sending a GetProtocolInfo( ) invocation to the media renderer 303.

In step 320, the control point 302 determines whether a protocol/format of the content to be played back is matched to any protocol/format in the protocol/format list received from the media renderer 303. If there is any matched protocol/format (i.e., if content playback is available in the media renderer 303), the control point 302 sends a PrepareForConnection( ) invocation to the media server 301 and receives AVTransportID capable of controlling a pertinent connection from the media server 301 in step 330. Similarly, the control point 302 can acquire an AV Transport (AVT) instance ID and an Rendering Control Service (RCS) instance ID by sending a PrepareForConnection( ) invocation to the media renderer 303. The RCS instance ID is used to control such parameters as volume, color and brightness of playback devices.

In step 340, the control point 302 invokes SetAVTransportURI( ) of the media server 301 or the media renderer 303 to play back the selected content. Here, the control point 302 delivers a Resource Uniform Resource Identifier (URI) of the content to be played back, using an argument.

In step 350, if the user pushes a playback button, the control point 302 invokes a Play( ) action of the media server 301 or the media renderer 303 to which it sent the SetAVTransportURI( ) invocation. When the control point 302 invokes a Play( ) action of the media renderer 303, the media renderer 303 requests the media server 301 to send a file corresponding to a URI delivered through SetAVTransportURI( ) to the media renderer 303. When the control point 302 invokes a Play( ) action of the media server 301, the media server 301 transmits a file corresponding to a URI that is set through SetAVTransportURI( ), to the media renderer 303. Here, HTTP, RTP and Institute of Electrical and Electronics Engineers (IEEE) 1394 are protocols used for streaming the content. In the streaming process, various actions for playback control may be invoked, such as Seek( ), Stop( ) and Pause( ). Also, various other RCS-related actions of the media renderer may be invoked to control volume (SetVolume( )), color and brightness of the playback device.

In step 360, after the content playback is completed, the control point 302 determines whether there is a repeated playback request from the user. If the user desires repeated playback, the control point 302 may repeat the content playback by returning to step 340. After completion of the playback, the control point 302 invokes in step 370 TransferComplete( ) to inform the media server 301 and the media renderer 303 of the playback completion. Upon invocation of the TransferComplete( ) action, the media server 301 and the media renderer 303 release the resources that were assigned for the connection.

Conventionally, specific AV content is played back using UPnP in the above-described operation. However, this method cannot select and play back only the user-desired scenes from among several contents.

SUMMARY OF THE INVENTION

An aspect of the present invention is to address at least the above-mentioned problems and/or disadvantages and to provide at least the advantages described below. Accordingly, an aspect of the present invention provides a UPnP-based scene playback method and apparatus for composing a scene by selecting only the user-desired scenes from among AV content in a media server and continuously playing back the composed scene, i.e. a scene group, on a media renderer, in playing back AV content using UPnP.

In accordance with the present invention, there is a method for playing back a scene using UPnP, in which a control point sends a request for a scene to be played back to a media server that stores Audio/Video (AV) content and receives the scene to be played back from the media server in response thereto, the control point receives information about supportable protocol and file format from a media renderer that will play back content, and determines a content resource, a protocol and a file format to be used for playback based on the information, the control point composes a scene to be played back based on the received scenes, and the media renderer plays back the composed scene.

In accordance with the present invention, there is an apparatus for playing back a scene using UPnP, in which a network transceiver communicates with a media server that stores AV content and a media renderer for playing back the content, using at least one of UPnP and other communication protocols, a storage stores content data received from the media server, a scene composer composes a scene to be played back based on scenes received from the media server, according to an input from a user, and a controller sends a request for a scene to be played back to the media server, receives the scene to be played back from the media server in response thereto, stores the received scene in the storage, checks the received scene, receives information about supportable protocol and file format from the media renderer, controls the scene composer to compose a scene to be played back, and controls the media renderer to play back the scene composed by the scene composer.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 9 illustrates metadata according to the present invention;

FIG. 11 illustrates an example of input parameters for a 'SetScene( )' action according to a first embodiment of the present invention;

FIG. 12 illustrates an example of input parameters for a 'SetScene( )' action according to a second embodiment of the present invention;

Throughout the drawings, the same drawing reference numerals will be understood to refer to the same elements, features and structures.

DETAILED DESCRIPTION OF THE EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for the sake of clarity and conciseness.

Figure 1:
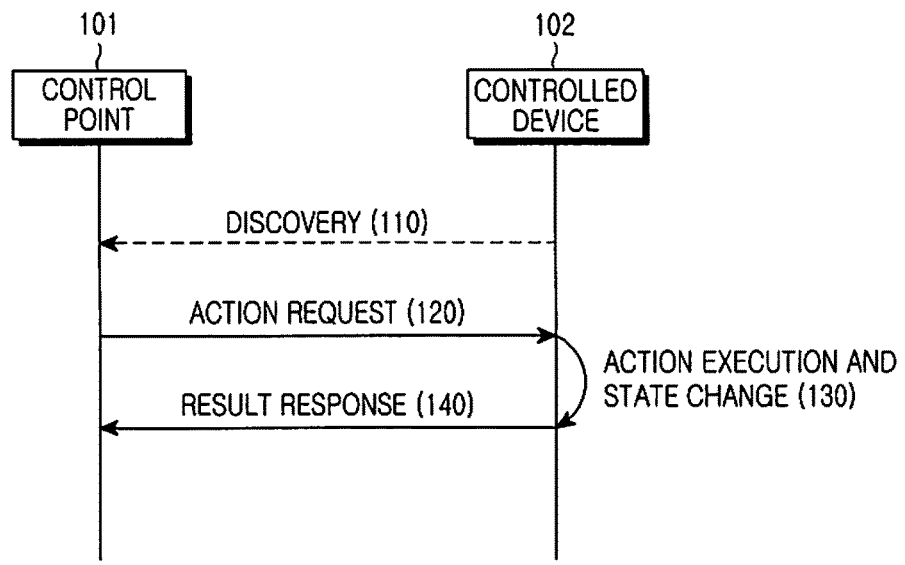
FIG. 1 illustrates device discovery and action execution in a conventional UPnP network system.
Figure 2:
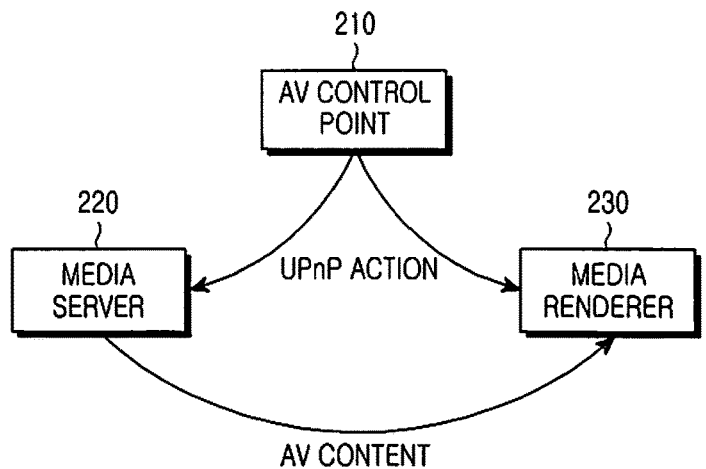
FIG. 2 illustrates a system for playing back AV content using UPnP, to which the present invention is applicable.
Figure 3:
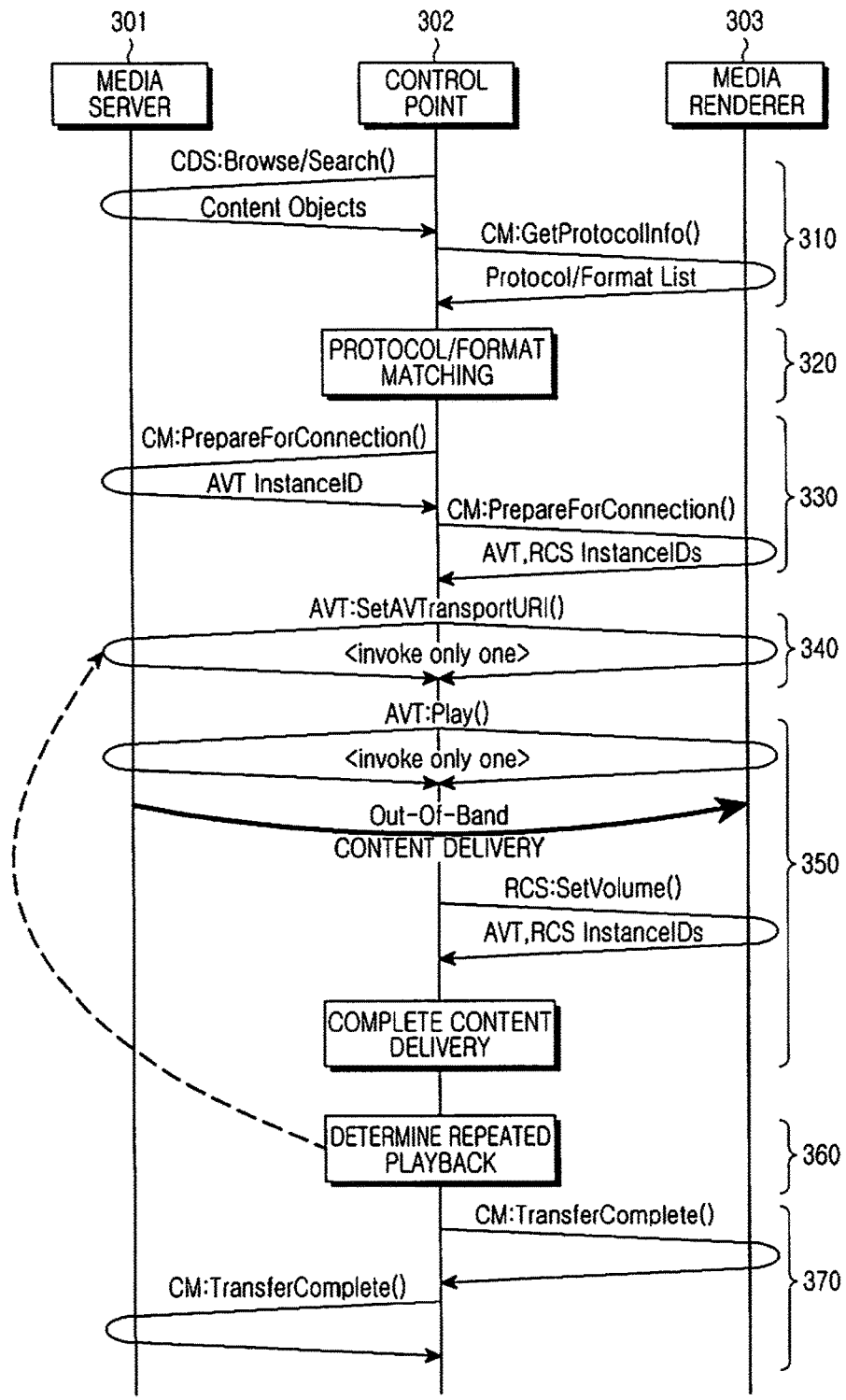
FIG. 3 illustrates a conventional operation of playing back specific content using UPnP.
Figure 4:
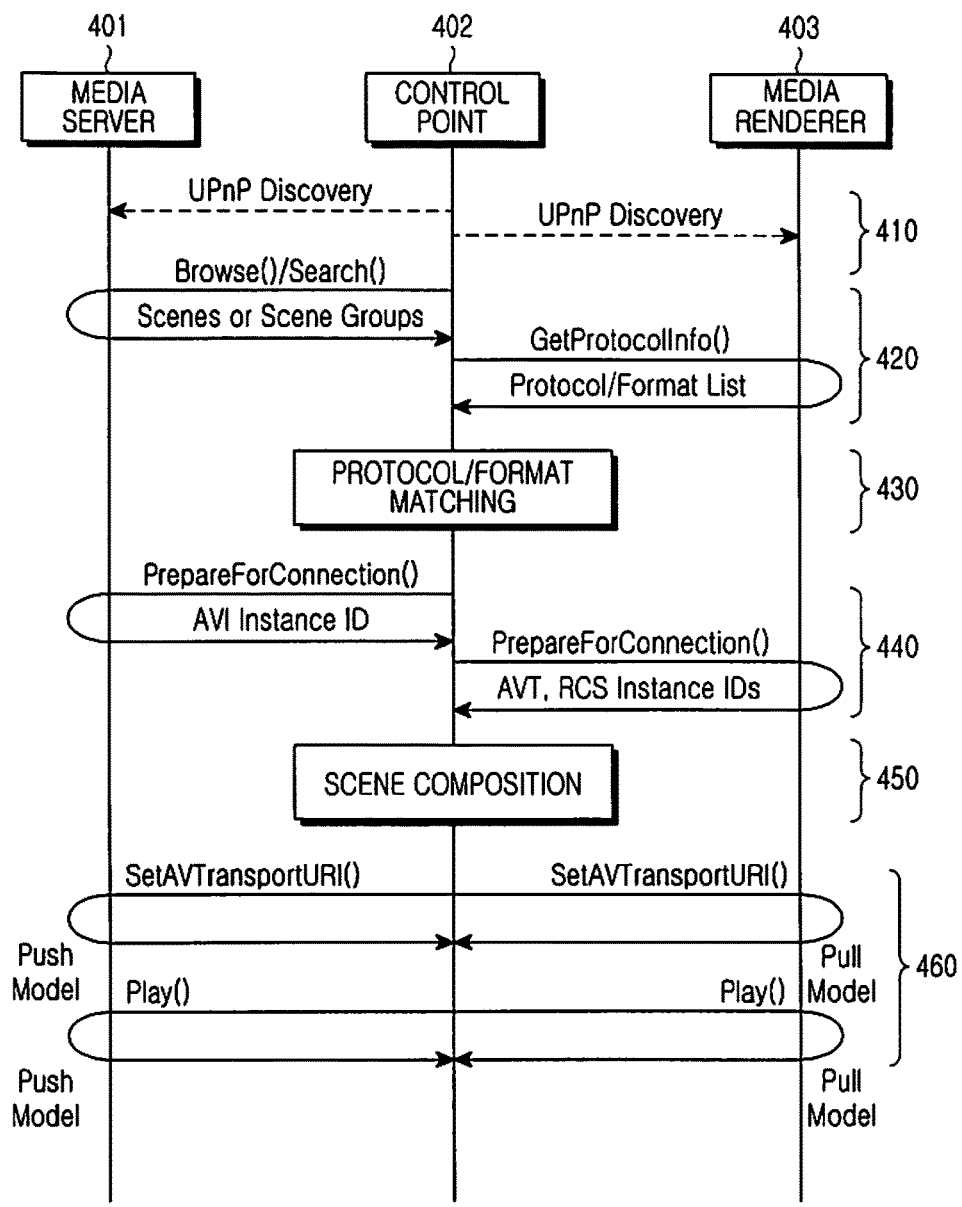
FIG. 4 illustrates an operation for playing back content using UPnP according to the present invention.

FIG. 4 illustrates an operation for playing back content using UPnP according to the present invention. Shown in FIG. 4 is a signal processing operation using a media server 401 in which AV are stored, a control point 402 for recomposing a scene by combining arbitrary scenes of content, and a media renderer 403 for playing back the recomposed scene group.

Referring to FIG. 4, in step 410, the control point 402 discovers the media server 401 and the media renderer 403 by performing a UPnP discovery operation.

In step 420, the control point 402 carries desired scenes from the media server 401 through a Browse( ) or Search( ) action. The control point 402 can carry scenes or scene groups as a result of the Browse( ) or Search( ) action. The scenes or scenes group may be predefined in an item or container form in a Content Directory Service (CDS) of the media server 401, and may be provided in a Description that carries information about contents based on XML used in UPnP AV, such as Digital Item Declaration Language (DIDL)-Lite.

The scene or scene group objects may include metadata information representing a precedence relation objectLink or a connection relation objectList between objects. For the sake of convenience, the description of FIG. 4 will resume after the description of FIG. 7 herein.

Figure 5:
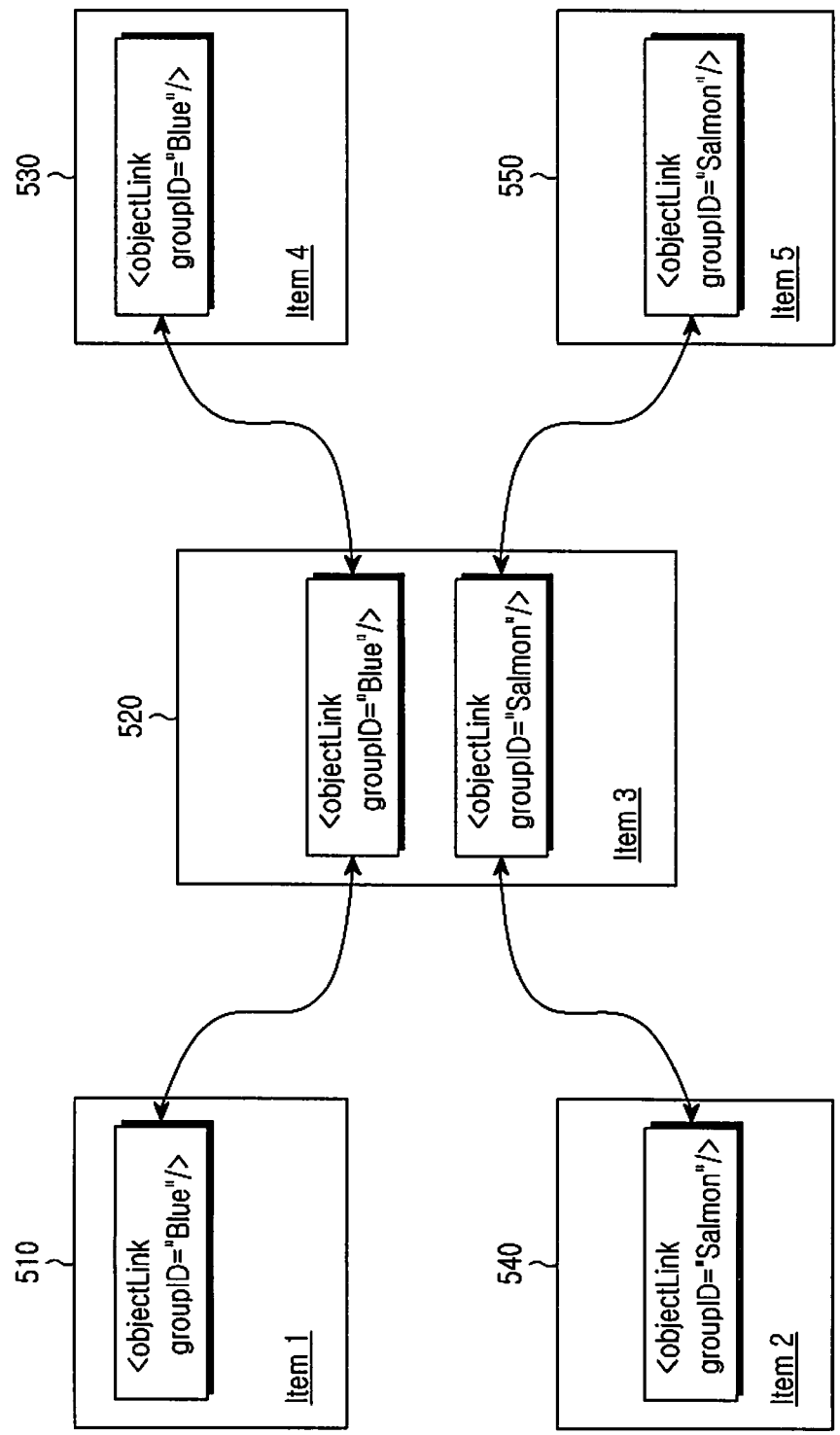
FIG. 5 illustrates a precedence relation objectLink between objects of scenes or scene groups according to the present invention.

FIG. 5 illustrates a precedence relation objectLink between objects of scenes or scene groups according to the present invention.

A precedence relation objectLink between objects may be represented by describing, in metadata information of an object, a next object's ID or a previous object's ID connected to the object and a first object's ID in the precedence list. A set of connection lists for the first object to the last object may be identified by a group ID. A specific object may simultaneously belong to a plurality of groups, in which case the object has metadata that includes connection relations for multiple items. Referring to FIG. 5, item #1 510, item #3 520, and item #4 530 have a precedence relation as having a group ID 'Blue', and item #2 540, item #3 520 and item #5 550 have a precedence relation as having a group ID 'Salmon'. In this case, item #3 520 is included in both of the two groups.

Figure 6:
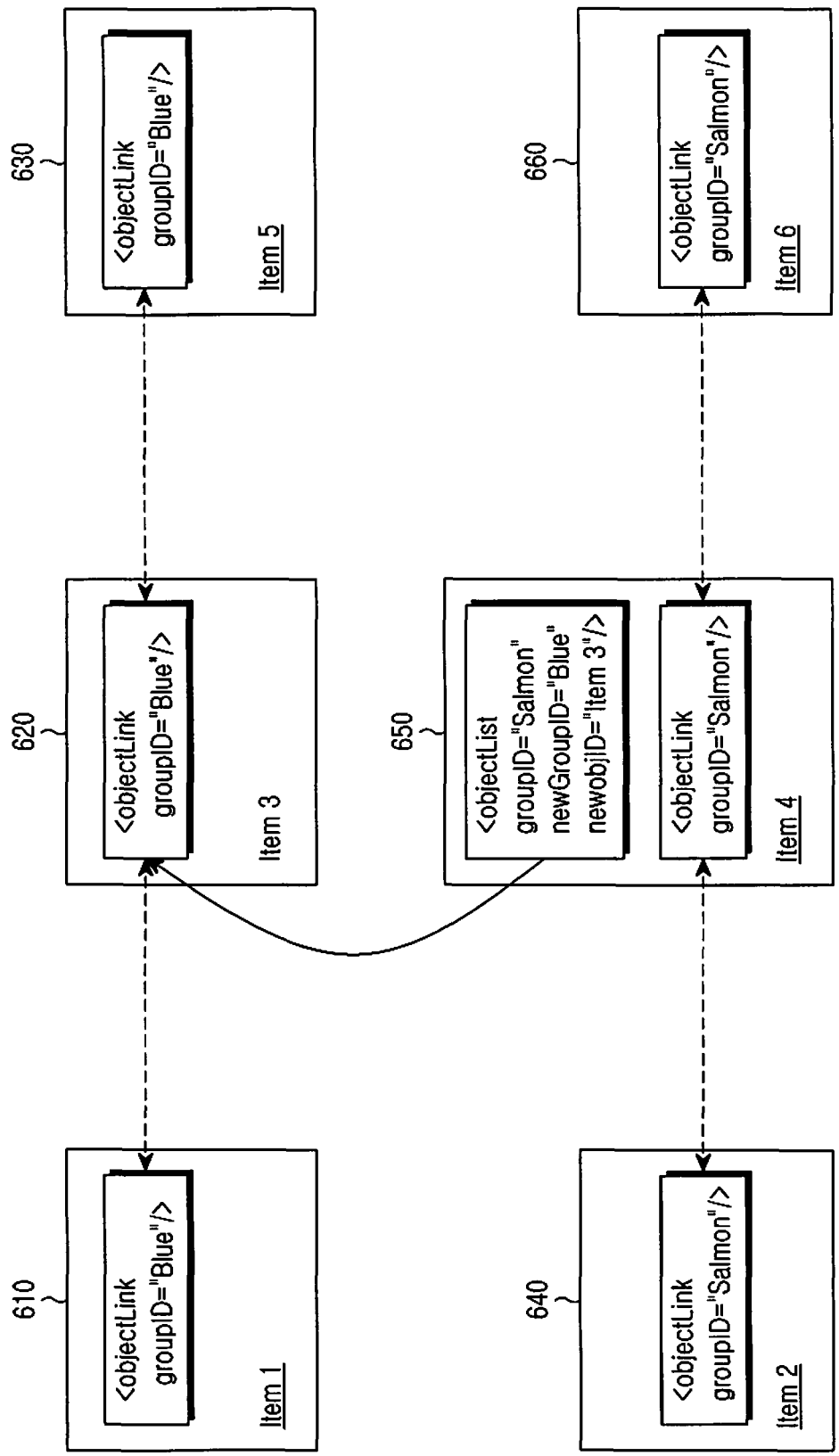
FIG. 6 illustrates a connection branch of a connection relation objectList between objects of scenes or scene groups according to the present invention.
Figure 7:
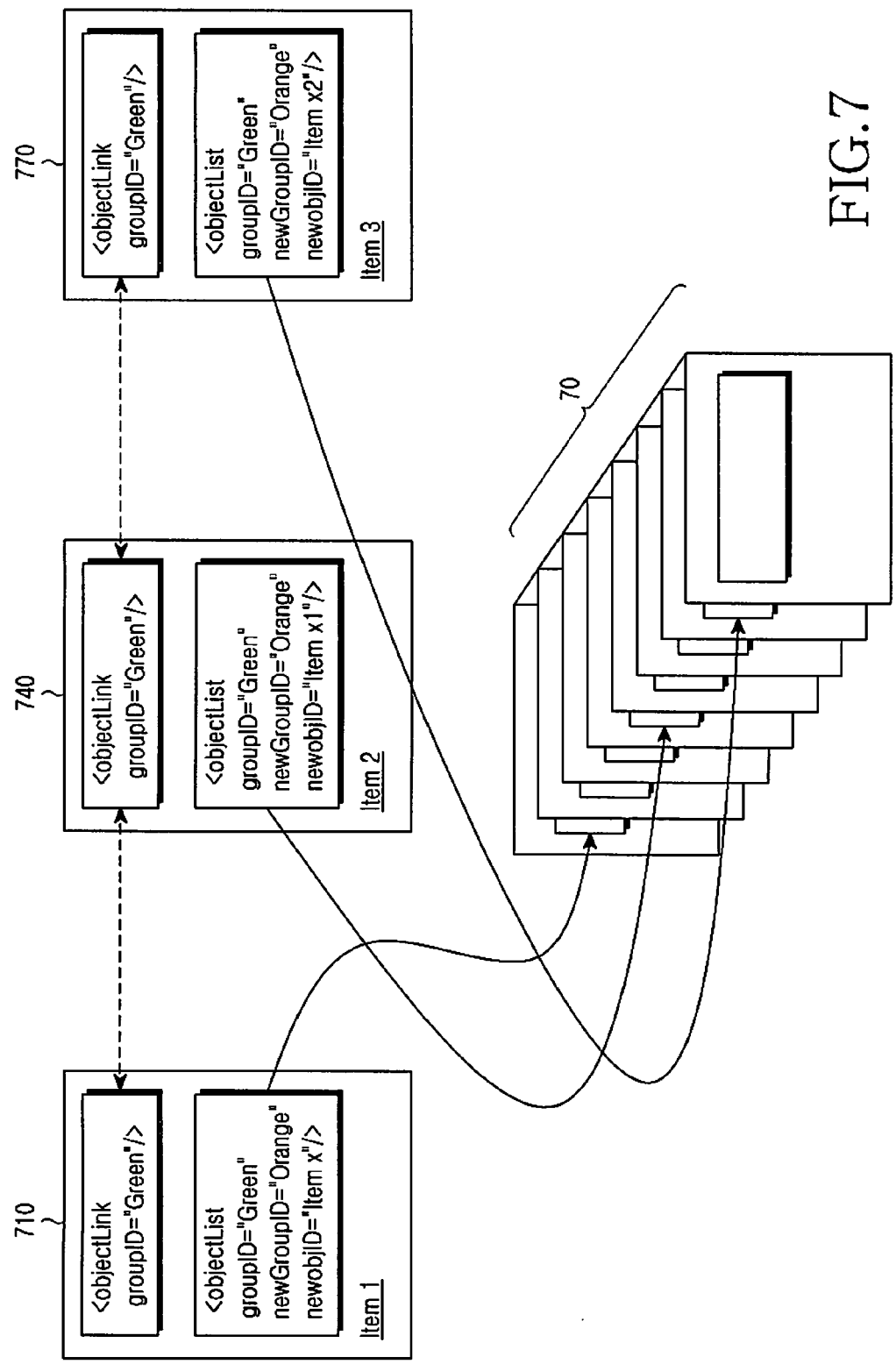
FIG. 7 illustrates a contents connection list Index of a connection relation objectList between objects of scenes or scene groups according to the present invention.

FIG. 6 illustrates a connection branch of a connection relation objectList between objects of scenes or scene groups according to the present invention, and FIG. 7 illustrates a contents connection list Index of a connection relation objectList between objects of scenes or scene groups according to the present invention.

A connection relation between objects may be represented by describing IDs of other objects capable of replacing a specific object or an ID of an object connection list.

As an example based on the connection relation between objects, a connection branch and a contents connection list Index can be considered. The connection branch represents a connection relation for moving to and playing back another object at a playback time of an object including inter-object connection relation information while playing back content according to the inter-object precedence relation. The inter-object connection relation information may be represented by designating objects in a connection list having another group ID in addition to the precedence relation information, or other objects in the same connection list. Referring to FIG. 6, item #1 610, item #3 620, and item #5 630 have a precedence relation as having a group ID 'Blue', and item #2 640, item #4 650 and item #6 660 have a precedence relation as having a group ID 'Salmon'. In this case, item #4 650 includes a connection relation with item #3 620 in the other precedence relation group.

The contents connection list is provided by creating a separate precedence connection list including a specific object for fast access to the specific object in the precedence connection list consisting of many objects. The control point may extract some screens from actual content data, which are appointed by objects in the contents connection list, in representing a user interface. Referring to FIG. 7, several items form one group 70, in which item #1 710, item #2 740 and item #3 770 have a separate precedence relation as having a group ID 'Green'.

Referring back to FIG. 4, in step 420, the control point 402 receives scenes or scene groups as a result of the Browse( )/Search( ) action. Thereafter, using a GetProtocolinfo( ) action, the control point 402 gets information about a supportable protocol and a playable file format for playback from the media renderer 403 that will play back scenes.

In step 430, the control point 402 checks the supportable protocol and format of the media renderer 403, and then determines the content binary (resource), protocol and format it will use in playing back scene content based on the protocol and format information of the media renderer 403.

In step 440, using a PrepareForConnection( ) action, the control point 402 exchanges instance IDs for use of Audio Video Transport (AVT) and RCS services between the media server 401 and the media renderer 403. The instance ID exchange is a process of acquiring an ID capable of designating a session to create a session to be used for content playback and manage the session. The RCS instance ID is for enabling a specific control point to use RCS of the media renderer, and can be applied in the method used in conventional UPnP AV. The AVT is used to perform an UPnP AV standard service used to actually transmit media from the media server 401 to the media renderer 403 in the media network. Actually, URIs and instance IDs of media are acquired using the AVT.

In step 450, the control point 402 composes scenes to be played back. The control point 402 may provide the scene or scene group objects represented based on the precedence relation/connection relation, received in step 420, to the user through a user interface such as a display, and the user may select scenes or scene groups and lists that the user will play back or edit, through a user interface such as an input unit.

In this case, according to the present invention, the control point 402 may perform scene composition using a SetScenes( ) action, which will be described in detail with reference to FIGS. 11 and 12.

The control point 402 may selectively compose scenesusing one of two different composition methods. The first method is to decide the precedence of individual scenes brought in the Browse( )/Search( ) step, and the second method is to compose scene groups by changing the precedence and arrangement of the received scene groups or adding/deleting individual scenes.

The control point 402 may update the composed scenes in the media server 401 using an UpdateObject( ) action (not shown).

Step 450 may be omitted, when a list of already composed scenes is played back, scene composition is unnecessary, or only a single scene is played back.

The control point 402 may determine a playback method by playing back objects in a connection list one after another from the beginning based on precedence connection relation information provided by the objects (Playback mode), may wait for a continual playback command from the user after playing back objects and stopping the playback (Step mode), and may extract a needed amount of object information in the list at a time considering a display device of the control point 402 and display the extracted objects on a screen of the control point 402 (Index mode). Information on the playback type may be included in object metadata information as part of the inter-object connection relation information, and the control point 402 may decide its operation based on the playback type information.

During scene playback, the control point 402 sets in step 460 a URI of scenes or scene groups to be played back, using a SetAVTransportURI( ) action. Thereafter, the media renderer 403 plays back the scenes or scene groups composed by the control point 402 in a Push or Pull manner using a Play( ) action.

As for the Play( ) action, Play( ) of the AVT service used in the conventional UPnP AV may be reused, and the data subject to Play( ) may also be media content represented by XML-type objects as in the prior art. The media content may further include object-related information, and the control point 402, which can analyze it, may perform the sequential playback, step playback and index representation operations using this information.

To continually play back the scenes or scene groups of the present invention, it is preferable to previously compose scene groups, manage the composed scene groups at CDS of the media server 401, and play back the composed scene groups at the media renderer 403.

Meanwhile, the present invention discloses a new method of creating segments of content at the media server. In the conventional UPnP AV metadata architecture, segment information is included in base content objects of CDS, or exists as separate segment CDS objects, which make reference to CDS base objects. That is, the segment CDS objects have only metadata information regarding offsets of base object resources without actual resources.

In this architecture, in order to play segments, the control point should intervene to repeat Seek( ) Play( ) and Stop( ) actions, or analyze content's metadata information included in SetAVTransportURI( ) and play back the segments using an Out-Of-Band protocol.

In accordance with the present invention, in a step of creating segment objects, the media server generates and assigns resource URIs so that the segment objects may also have their resources. That is, in the media server, segment objects of AV content are assigned resource URIs. Accordingly, the present invention provides a method capable of playing back the segments in the method of playing back base objects.

Thus, in step 420 of FIG. 4, the result values of Browse( )/Search( ) actions for segment objects may be a first classification in which the result values have base objects and offsets (segment information, a second classification in which the result values are segment objects having only references to the base objects, or a third classification in which the result values are segment objects having playable resource URIs according to the present invention.

In the old metadata architecture, segment information such as start point and end point is included in base content objects (Option 1), or the segment information is included in separate CDS objects, which are unplayable (Option 2).

First playback architecture of Option 1 is used by the content point to control start and end of content playback. Seek( ) is used to position in the start point, and Stop( ) is used when the playback reaches the end point. In this case, the control point should exist in the network during the entire playback operation. In addition, the control point may not exactly locate in the start point and the end point because of the limited accuracy of local clocks of the control point or of the devices using byte-based offsets.

Figure 8:
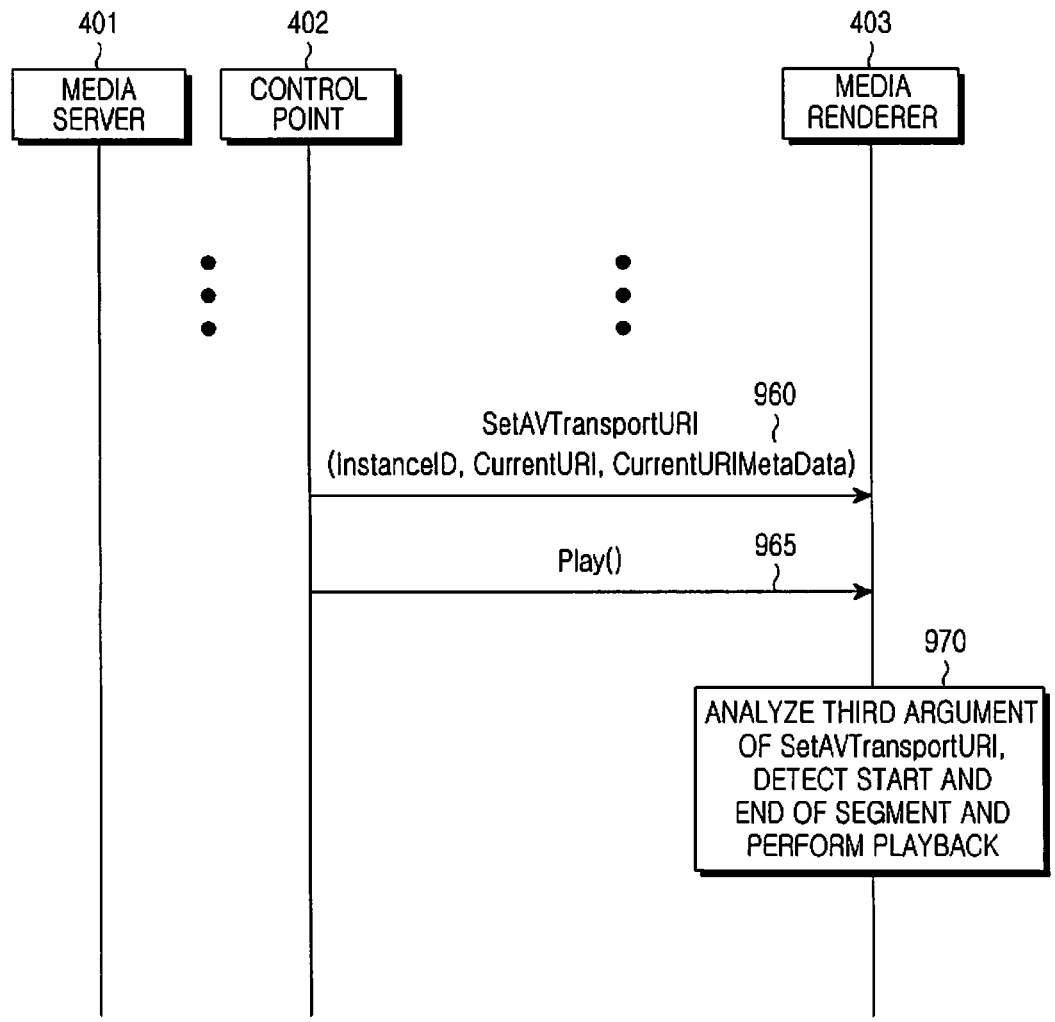
FIG. 8 illustrates a conventional operation for playing back content using Audio Video Transport (AVT)

FIG. 8 illustrates a conventional operation for playing back content using an Audio Video Transport (AVT) service.

In FIG. 8, the previous steps for content playback are omitted, and AVT is assumed to exist in the media renderer 403.

Referring to FIG. 8, in the playback architecture of Option 2, when the control point 402 delivers SetAVTransportURI( ) to the media renderer 403 for playback of content in step 960, it uses a CurrentURIMetaData argument to deliver offset information of the start and the end to AVT of the media renderer 403. If Play( ) is invoked in step 965, AVT of the media renderer 403 determines in step 970 start and end points of the segment by analyzing CurrentURIMetaData, or a third argument, to retrieve the segment for content playback.

In this case, the conventional AVT may not play back segments since it cannot recognize offset information in CurrentURIMetaData. Besides, the AVT may not identify the "out-of-band" protocol that the media renderer may support to retrieve segments of the base contents.

Therefore, the present invention discloses a new metadata architecture. FIG. 9 illustrates metadata according to the present invention. In FIG. 9, each segment descriptor is represented by a single CDS item. An <res> element in the segment descriptor is playable content for the segment.

When a new segment object is created, CDS determines that the new object is a segment descriptor and is created in correspondence with an <res> element based on start-and-end offset metadata. The offset metadata may include such information as time, byte and frame start/end values. An <res> element of the created segment object may have an <resExt> element, which is an extended element describing detailed information of the element. The extended element <resExt> may include base content referenced by the segment object and base resource of the base content, in addition to the offset metadata.

Figure 10:
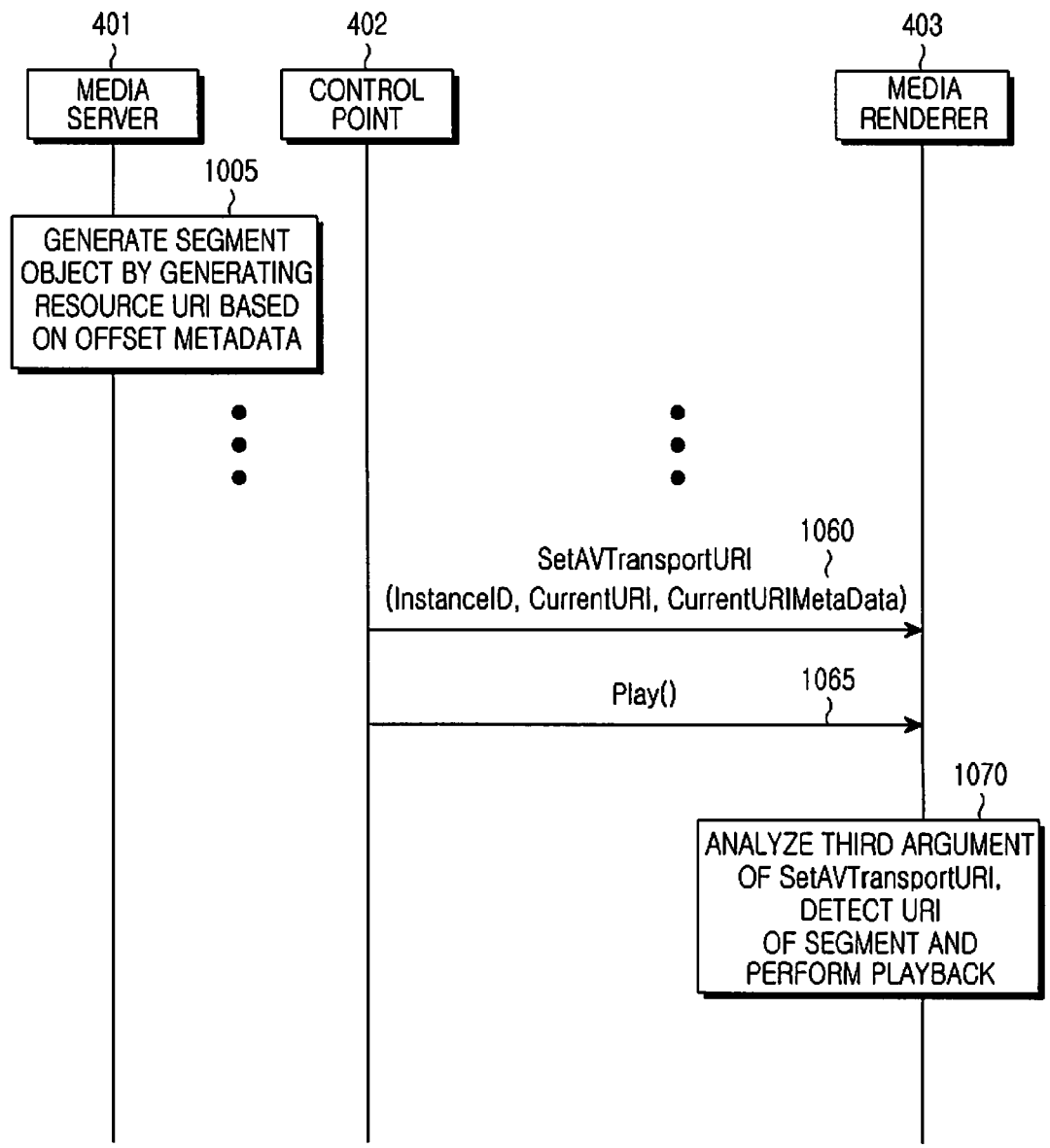
FIG. 10 illustrates an operation of playing back content using metadata according to the present invention.

FIG. 10 illustrates an operation of playing back content using metadata according to the present invention. In FIG. 10, the previous steps for content playback are omitted, and AVT is assumed to exist in the media renderer 403.

Referring to FIG. 10, the media server 401 generates in step 1005 a resource URI in which offset metadata was already reflected, while generating a segment object. After performing steps for playing back content using the segment object generated in step 1005 (not shown), the control point 402 transmits SetAVTransportURI( ) to the media renderer 403 in step 1060, and transmits Play( ) to the media renderer 403 to play back content in step 1065. Then, in step 1070, the media renderer 403 can determine the segment's URI by analyzing a CurrentURIMetaData argument of SetAVTransportURI( ), and perform playback using the URI.

The playback architecture of the present invention is equal to other CDS items in terms of segment playback. The <res> element of the segment descriptor is generated by CDS to represent a segment of the base item, and its format is dependent on Digital Media Server (DMS) execution.

Meanwhile, the present invention may use the following methods in addition to the above-described methods during scene composition in step 450 of FIG. 4.

In the existing method, segment information should necessarily exist in CDS of the media server 401 in order to play back segments. In this case, the CDS may include the segment information in base objects, or may have separate segment objects. When no segment information exists in CDS, the user should inconveniently store segment information in CDS even for the segments that will no longer be used.

Accordingly, the present invention discloses a method of providing resource URIs that are not stored in CDS but can be used to play back segments. The provided resource URIs are used to perform playback using the existing CDS object playback method. The method is changed to add not only the method of generating scene groups by making a list of object IDs of segments in the scene composition phase of step 450 in FIG. 4, but also the method of making a playback list by temporarily generating at the media server 401 resource URIs of segments that are not stored in CDS presently (i.e., there is no ObjectID), but that the user desires to play back. In this case, the SetScene( ) action used during scene composition in step 450 may be optionally used and playback order may be appointed using SetAVTransportURI( ) and SetNextAVTransportURI( ) defined in the existing UPnP AV.

In the existing UPnP AV, when the user desires to play back a specific part of the base content, the following three cases may occur. In the first case, segment objects for the specific part exist in CDS. In the second case, segment objects for the specific part do not exist in CDS, but the user wants generation of segment objects so that the user may later reuse the segment definition. In the third case, segment objects for the specific part do not exist in CDS and the user does not want the generation as the user will not reuse the segment definition.

In the first case, the user may use Browse( )/Search( ) to acquire segment metadata, and play back the segments. In the second case, the user may create segment objects using CreateObject( ), and play back the objects. In these two cases, the existing method is available. However, in the third case, the user needs generation of segment objects, and the segment objects are to be deleted after their generation.

Therefore, a new action of CreateDynamicSegment( ) is newly defined in the present invention. CreateDynamicSegment( ) is different from CreateObject( ) as CDS does not instantly generate objects, but it returns metadata of only virtual objects.

An argument for CreateDynamicSegment( ) is defined in Table 1 below.

TABLE 1

| Argument | Direction | Related State Variable |
|---|---|---|
| Elements | IN | A_ARG_TYPE_Result |
| Result | OUT | A_ARG_TYPE_Result |

The argument elements include metadata that is necessary to create segment objects. For example, the elements may include class property (the upnp) for indicating that it is a segment object, an object ID of base content, a start point and an end point of a segment in the base content, and other properties by DIDL-Lite schema (@id property is set as " " and @parentID property is set as " " or "0").

CDS should compose metadata in output arguments, for virtually created segment objects. CDS provides an <res> element for the virtual segments.

A playback method using the CreateDynamicSegment( ) includes:

Step 1: A control point invokes a CreateDynamicSegment( ) action from CDS, and provides all metadata needed to generate segment objects, with input arguments.

Step 2: At output arguments of CreateDynamicSegment( ), CDS returns virtual segment objects.

Step 3: The control point receives metadata of the virtual segment objects and invokes a SetAVTransportURI( ) action from an AVT service using the metadata of the virtual segment objects.

Step 4: The control point may perform a Play( ) action, a Pause( ) action and a different AVT action for controlling segment playback.

Meanwhile, a similar extensible method for CreateDynamicSegment( ) can be used to make a dynamic segment list. In this case, the control point 402 provides metadata necessary to generate multiple 'virtual' segment objects.

FIG. 11 illustrates an example of input parameters for a 'SetScene( )' action according to a first embodiment of the present invention. InstanceID refers to a virtual instance ID provided from an AVT service. Using this value, a control point can manage playback of scenes or scene groups being played back between a media server and a media renderer. ScenesToBePlayed indicates information about scenes to be played back, and ScenesToBeSkipped indicates information about scenes to be skipped during playback. ScenesToBePlayed and ScenesToBeSkipped may be made based on a Comma Separated Value (CSV) form or XML, and the media server and the media renderer may perform playback by recognizing the CSV/XML.

FIG. 12 illustrates an example of input parameters for a 'SetScene( )' action according to a second embodiment of the present invention. By providing a combination of an AVT instance ID and scenes to be played back in scene groups, i.e., scene group information, the scene groups made by the control point before playback can be played back at a later time.

The scene groups disclosed in the present invention may be made based on CSV form or an XML, and the media server and the media renderer may perform playback by recognizing the CSV/XML.

Regarding a difference between the actions and parameters disclosed in FIGS. 11 and 12, while the method of FIG. 11 specifies ScenesToBePlayed and ScenesToBeSkipped in all scenes the control point brought, the method of FIG. 12 needs a specific User Interface (UI) application for the control point, i.e., an additional application capable of editing scenes or scene groups. However, both methods can be applied to play back scenes without a pause in order to achieve the embodiments of the present invention. Despite a slight change in number and contents of parameters, the present invention can combine and play back scenes based on UPnP without departing from the scope of the invention.

Figure 13:
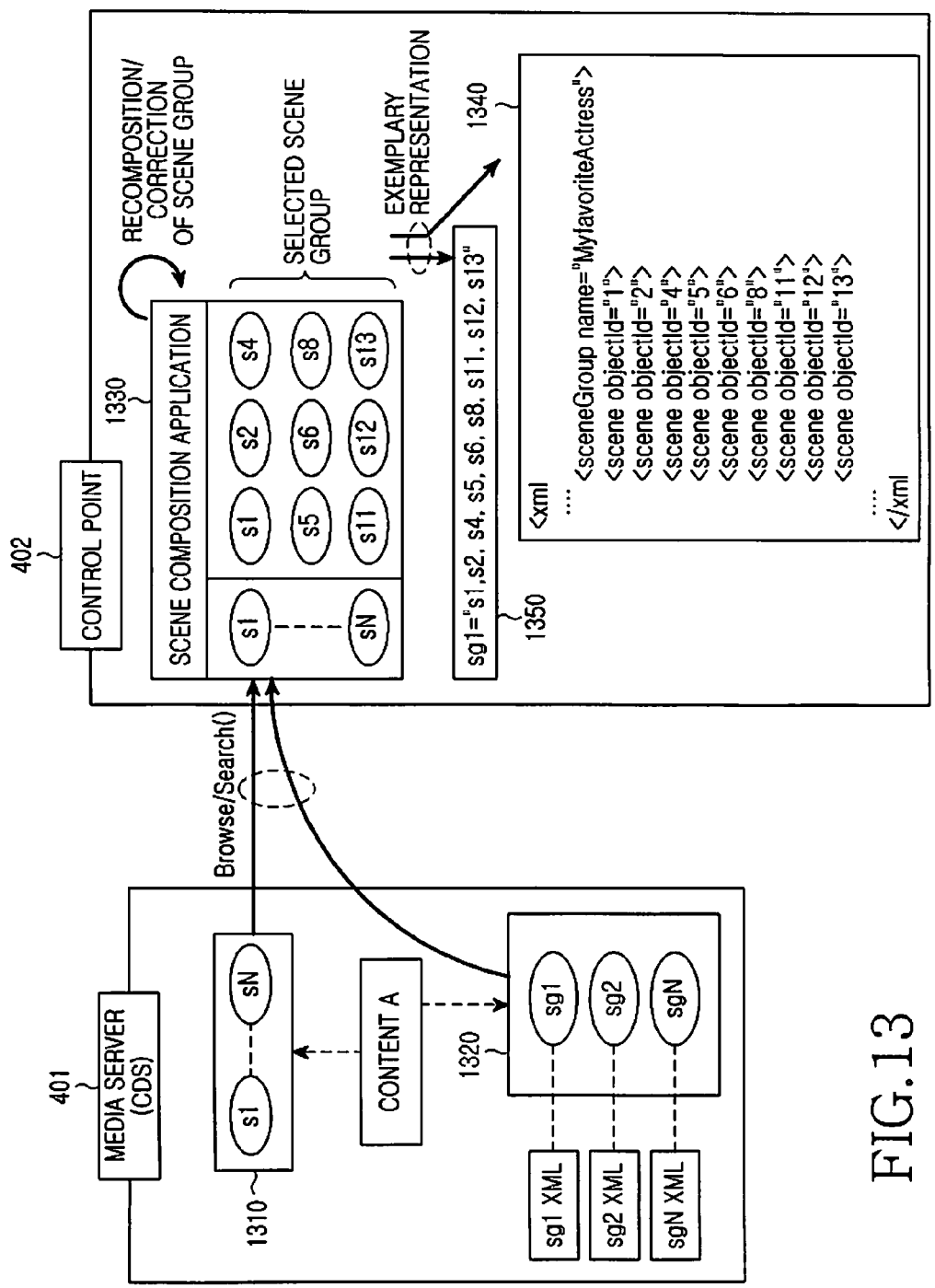
FIG. 13 illustrates a scene composition operation according to the present invention.

FIG. 13 illustrates a scene composition operation according to the present invention. In FIG. 13, when the scenes extracted from arbitrary content in the media server 401 are indicated by s1, s2, . . . , sN, one content A may be divided into N scenes 1310 or N segments 1320. Scene groups may also be managed in the form of one CDS object in the media server. The scenes or scene groups may be brought from CDS by an UPnP action such as Browse/Search( ) and then provided to the control point 402 as a response. Thereafter, the control point 402 may combine or change the provided scenes or scene groups using a scene authoring (or scene composition) application 1330 upon a user's request. The user may select desired scenes from a list of scenes s1 to sN using an UI, i.e., the scene authoring application 1330. In this case, the user can select the scenes in various methods, including Drag & Drop.

The selected scenes may be grouped in a predetermined method. The present invention, as illustrated in FIG. 9, defines an XML Scheme that the media server 401 or the media renderer 403 can comprehend at a playback time, and may represent the scenes by enumerating all scenes to be played back in a scene group tag (1340), or represent the scenes based on CSV (1350).

Figure 14:
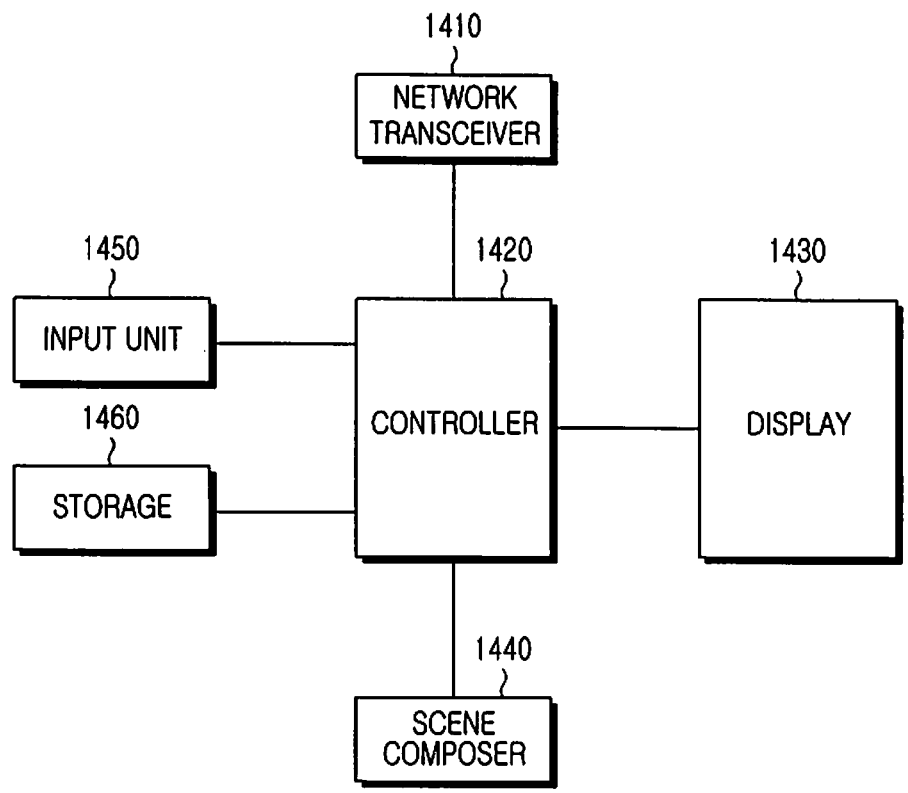
FIG. 14 illustrates a control point in a system for playing back AV content using UPnP according to the present invention.

FIG. 14 illustrates a control point in a system for playing back AV content using UPnP according to the present invention.

Referring to FIG. 14, a control point 402 according to an embodiment of the present invention includes a network transceiver 1410, a controller 1420, a display 1430, a scene composer 1440, an input unit 1450, and a storage 1460.

The network transceiver 1410 performs communication using a UPnP network or other communication protocol. In the present invention, the control point 402 exchanges content data and signals with a media server 401 or a media renderer 403 through the network transceiver 1410.

During selection of content to be played back, the display 1430 displays a screen for enabling the user to select content the media server 401 intends to play back, and scenes or scene groups of the content. During the scene composition, the display 1430 displays a screen for enabling the user compose scenes or scene groups of the content. The input unit 1450 receives inputs from the user during content selection and scene composition.

The storage 1460 stores various data that the control point 402 needs in performing operations. In the present invention, the storage 1460 stores the content received from the media server 401.

The scene composer 1440 selects and recomposes scenes to be played back, based on the scenes received from the media server 401, according to an input received from the user through the input unit 1450.

The controller 1420 controls the overall operation of the control point 402. In the present invention, the controller 1420 sends a request for scenes to be played back to the media server 401, receives the scenes from the media server 401 as a response to the request, stores the received scenes in the storage 1460, checks the received scenes, receives information about playable protocol and file format from the media renderer 403 that will play back the scenes, controls the scene composer 1440 to compose the scenes to be played back, and controls the media renderer 403 to play back the scenes composed by the scene composer 1440.

In practice, however, the control point 402 may be implemented as part of the media server 401 or the media renderer 403. When the control point 402 is implemented as part of the media server 401, the storage 1460 may store base AV contents. When the control point 402 is implemented as part of the media renderer 403, the content may be played back on the display 1430 during content playback.

As is apparent from the foregoing description, when a home network using UPnP generates AV content, the user can recompose desired scenes using a control point at a set time, and the recomposed scenes, i.e., a scene group, can be continually played back through the media server or the media renderer.

In addition, the control point brings scenes included in arbitrary content or previously generated scene groups in an UPnP environment, and recomposes the brought scenes or scene groups at a set time, thereby playing back the scenes or scene groups as if they are one content.

Further, in generating segment objects, the media server generates and assigns resource URIs so that segment objects can also have their own resources. Thus, the segments may be played back in the method of playing back base objects.

While the UPnP-based scene playback method and system has been shown and described with reference to a certain embodiments of the present invention, it will be understood by those skilled in the art that various changes in form and details may be made therein without departing from the spirit and scope of the invention as defined by the appended claims and their equivalents.

What is claimed is:

1. A method for managing playback of a media renderer, by a control point, using Universal Plug and Play (UPnP), comprising:
sending, to a media server, a request for one or more scene objects;
receiving the one or more scene objects from the media server;
receiving, from the media renderer, information about a supportable protocol of the media renderer and a supportable file format of the media renderer;
determining a content resource, a protocol and a file format to be used for playing back based on the information;
composing a scene to be played back by deciding a precedence relation of the one or more scene objects or changing the precedence relation of the one or more scene objects, wherein the precedence relation includes an objectLink group identifier that is used to distinguish the one or more scene objects; and
controlling the media renderer to play back the scene,
wherein a first scene object among the one or more scene objects includes metadata representing a connection relation indicating a second scene object capable of replacing the corresponding scene object,
wherein the connection relation includes a connection branch or a first contents connection list having a first group identification,
wherein the connection branch is configured to play back the second scene object at a playback time of the first scene object including inter-object connection relation information, which is represented by designating the second scene object in a second contents connection list having a second group identification, and
wherein the first contents connection list is configured to access a third scene object in a precedence connection list.

2. The method of claim 1, wherein the scene is a single scene or a scene group.

3. The method of claim 1, wherein receiving the one or more scene objects comprises:
receiving the one or more scene objects from a Content Directory Service (CDS) in the media server using a 'Browse( )' action or a 'Search( )' action.

4. The method of claim 1, wherein the media server stores audio/video (AV) content including a plurality of segment objects, and each of the segment objects is assigned a resource Uniform Resource Identifier (URI).

5. The method of claim 4, wherein the one or more scene objects are a base object having an offset value, a segment object having a reference value for the base object, or a segment object having a playable resource URI.

6. The method of claim 4, further comprising:
if a segment object to be played back is not stored in the media server, transmitting, to the media server, a request for generating a virtual segment object including a resource URI of the segment object;
receiving, from the media server, the virtual segment object; and
composing the scene to be played back by using the virtual segment object.

7. The method of claim 1, wherein composing the scene comprises determining playback orders of the one or more scene objects.

8. The method of claim 1, wherein composing the scene comprises changing a precedence relation of scenes included in a scene group, or adding a specific scene to the scene group or deleting a specific scene from the scene group.

9. A control point for managing playback of a media renderer using Universal Plug and Play (UPnP), comprising:
a communication interface configured to:
send, to a media server, a request for one or more scene objects,
receive the one or more scene objects from the media server, and
receive, from the media renderer, information about a supportable protocol of the media renderer and a supportable file format of the media renderer; and
a processor configured to:
determine a content resource, a protocol and a file format to be used for playing back based on the information,
compose a scene to be played back by deciding a precedence relation of the one or more scene objects or changing the precedence relation of the one or more scene objects, wherein the precedence relation includes an objectLink group identifier that is used to distinguish the one or more scene objects, and
control the media renderer to play back the scene,
wherein a first scene object among the one or more scene objects includes metadata representing a connection relation indicating a second scene object capable of replacing the corresponding scene object,
wherein the connection relation includes a connection branch or a first contents connection list having a first group identification,
wherein the connection branch is configured to play back the second scene object at a playback time of the first scene object including inter-object connection relation information, which is represented by designating the second scene object in a second contents connection list having a second group identification, and
wherein the first contents connection list is configured to access a third scene object in a precedence connection list.

10. The control point of claim 9, wherein the scene is a single scene or a scene group.

11. The control point of claim 9, wherein the one or more scene objects are transmitted from a Content Directory Service (CDS) in the media server using a 'Browse( )' action or a 'Search( )' action.

12. The control point of claim 9, wherein the media server stores audio/video (AV) content including a plurality of segment objects, and each of the segment objects is assigned a resource Uniform Resource Identifier (URI).

13. The control point of claim 12, wherein the one or more scene objects are a base object having an offset value, a segment object having a reference value for the base object, or a segment object having a playable resource URI.

14. The control point of claim 12, wherein the processor is further configured to:
if a segment object to be played back is not stored in the media server, control the communication interface to transmit, to the media server, a request for generating a virtual segment object including a resource URI of the segment object,
control the communication interface to receive, from the media server, the virtual segment object, and
compose the scene using the virtual segment object.

15. The control point of claim 9, wherein the processor is further configured to determine playback orders of the one or more scene objects.

16. The control point of claim 9, wherein the processor is further configured to change a precedence relation of scenes in a scene group, add a specific scene to the scene group or delete the specific scene from the scene group.

17. The method of claim 1, wherein each of the one or more scene objects further includes metadata representing a precedence relation indicating a corresponding scene object's location in a sequence of the one or more scene objects.

\* \* \* \* \*